US012781106B2

(12) United States Patent
Fomenko et al.

(10) Patent No.: US 12,781,106 B2
(45) Date of Patent: Nov. 3, 2026

(54) ACRYLIC PRESSURE-SENSITIVE ADHESIVE AND ALSO ADHESIVE TAPE FURNISHED WITH ACRYLIC PRESSURE-SENSITIVE ADHESIVE

(71) Applicant: TESA SE, Norderstedt (DE)

(72) Inventors: Eugen Fomenko, Norderstedt (DE); Franziska Eberhardt, Hamburg (DE); Kane Stapelfeldt, Hamburg (DE); Jan-Hendrik Jensen, Hamburg (DE); Daniel Schmitz-Stapela, Hamburg (DE)

(73) Assignee: TESA SE, Norderstedt (DE)

( * ) Notice: Subject to any disclaimer, the term of this patent is extended or adjusted under 35 U.S.C. 154(b) by 149 days.

(21) Appl. No.: 18/461,352

(22) Filed: Sep. 5, 2023

(65) Prior Publication Data

US 2024/0076529 A1 Mar. 7, 2024

(30) Foreign Application Priority Data

Sep. 7, 2022 (DE) ........................ 102022122740.5

(51) Int. Cl.
*C09J 133/08* (2006.01)
*C08K 5/3412* (2006.01)
(Continued)

(52) U.S. Cl.
CPC ............... *C09J 133/08* (2013.01); *C09J 7/21* (2018.01); *C09J 7/385* (2018.01); *C08K* *5/3412* (2013.01);
(Continued)

(58) Field of Classification Search
CPC ... C09J 133/08; C09J 7/21; C09J 7/385; C09J 2203/31; C09J 2301/122; C09J 2301/302;
(Continued)

(56) References Cited

U.S. PATENT DOCUMENTS 5,420,195 A * 5/1995 Mayer .................... C09J 133/08 524/561
9,550,924 B2 * 1/2017 Ko ......................... C09J 133/08
(Continued)

FOREIGN PATENT DOCUMENTS

EP 2298846 A1 3/2011
WO WO-2016114100 A1 * 7/2016 ............ C09J 133/00
WO WO-2020020714 A1 * 1/2020 ........... C08G 18/758

OTHER PUBLICATIONS

Machine Translation of WO 2016-114100 A1 (Year: 2025).*
DE Office Action in corresponding application DE 102022122740.5 dated Mar. 10, 2023.

*Primary Examiner* — Scott R. Walshon
(74) *Attorney, Agent, or Firm* — Norris Mclaughlin, PA

(57) ABSTRACT

An acrylic pressure-sensitive adhesive was to be provided that finds use especially in a reversible adhesive tape that is redetachable without leaving any residue, the adhesive tape having a particularly flat paper backing with high air permeability, and thus gives rise to particularly precise and flat paint edges when applied. This is achieved by an acrylic pressure-sensitive adhesive based on polymers having the following monomer composition:

(a) 97% to 99% by weight of monomers from the group comprising 2-ethylhexyl acrylate or 2-octyl acrylate or n-heptyl acrylate or mixtures of at least two of said monomers,
(b) 1% to 3% by weight of (meth)acrylic acid and further comprising a crosslinking system, wherein the ratio of the reactive crosslinking groups and the carboxy groups of (meth)acrylic acid (b) is less than or equal to 7% and wherein the polymers are produced by emulsion polymerization.

The invention also provides an adhesive tape comprising a backing and—applied to at least one side of the backing—an
(Continued)

acrylic pressure-sensitive adhesive of the invention in the form of a dried polymer dispersion and also the use of such an adhesive tape.

20 Claims, 1 Drawing Sheet

(51) Int. Cl.
*C09J 7/21* (2018.01)
*C09J 7/38* (2018.01)

(52) U.S. Cl.
CPC ...... *C09J 2203/31* (2013.01); *C09J 2301/122* (2020.08); *C09J 2301/302* (2020.08); *C09J 2400/283* (2013.01); *C09J 2433/00* (2013.01)

(58) Field of Classification Search
CPC ............. C09J 2400/283; C09J 2433/00; C08F 220/1808; C08F 220/1807
See application file for complete search history.

(56) References Cited

U.S. PATENT DOCUMENTS

| | | | | |
|---|---|---|---|---|
| 2008/0087196 | A1 | 4/2008 | Anderson et al. | |
| 2010/0151241 | A1 | 6/2010 | Hardy et al. | |
| 2011/0046296 | A1* | 2/2011 | Morino .................... | C09J 7/385 524/556 |
| 2012/0263948 | A1* | 10/2012 | Amano .................... | C09J 7/385 524/388 |
| 2012/0321819 | A1 | 12/2012 | Kim et al. | |
| 2021/0147720 | A1 | 5/2021 | Torre et al. | |
| 2021/0332031 | A1* | 10/2021 | Overbeek ............ | C07D 403/14 |

* cited by examiner

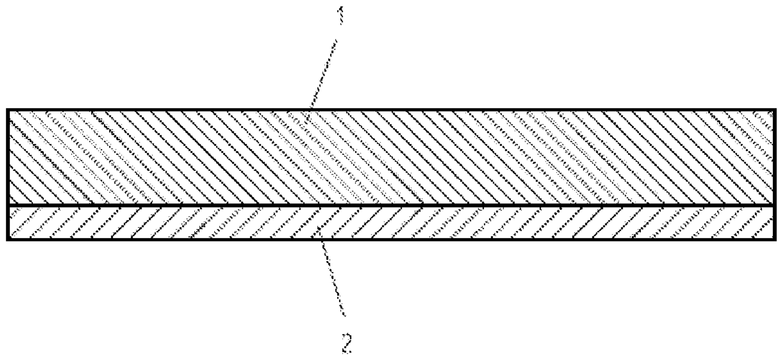
1
2

ACRYLIC PRESSURE-SENSITIVE ADHESIVE AND ALSO ADHESIVE TAPE FURNISHED WITH ACRYLIC PRESSURE-SENSITIVE ADHESIVE

This application is based on DE 102022122740.5, filed 7 Sep. 2022. The present application claims the full priority benefit of all prior applications and incorporates by reference their full disclosures as if set forth herein.

The invention relates to an acrylic pressure-sensitive adhesive produced by emulsion polymerization and to an adhesive tape furnished with the acrylic pressure-sensitive adhesive that can be used as an adhesive masking tape in particular.

Self-adhesive masking tapes, hereinafter referred to also as masking tape or adhesive masking tape, are mostly one-sided adhesive masking tapes having films or paper backings that are used for temporarily covering surfaces during painting processes, that are temperature-resistant under a range of processing conditions and that can be removed without leaving any residue, and that have key properties that allow them to meet the specific requirements placed on them. These are—without this list claiming to be exhaustive—low thickness, adequate tensile strength (maximum tensile force), good extensibility (elongation at break), adequate but not excessively high adhesive strength, residue-free redetachability after the loads borne during use, good adhesion of paints on the reverse side, resistance to colour penetration, dosed adhesive strength on relevant surfaces and on its own reverse side and also manual tearability Preference is accordingly given to using paper backings for adhesive masking tapes, in particular ones furnished with a defined tensile strength by virtue of the type of pulp used, by the degree of milling and by certain chemical auxiliaries and with a defined extensibility by virtue of special process steps such as creping or the Clupak process.

These raw materials and process steps are left exclusively to the art of the papermaker and are not generally available to manufacturers of adhesive masking tapes, since they usually buy in the raw paper serving as the basis for the adhesive masking tape.

Extensibility is an important property of adhesive masking tapes. This is because it enables full-surface and wrinkle-free bonding in curves and on spherical surfaces, as is necessary for example when repairing paintwork on cars; a stretchable adhesive masking tape can be applied by hand to perfectly follow soft contours and thus lead to a clean paint edge without paint creeping underneath. The required extensibility in the longitudinal direction is in the range of 8 to 15% (elongation at break) for masking tapes based on so-called fine crepe backings and 20 to 80% for those based on strongly creped paper backings. The trade-off between tensile strength and elongation is such that bonding occurs without problem when manually applying the adhesive tape in a curved shape, wherein some of the elongation is drawn out but without the paper backing tearing on the outer side of the curve.

In addition to the adhesive masking tapes with creped backings mentioned above, there are also ones having an uncreped backing (flatback). These adhesive tapes include also ones based on what is known as Japan paper (also washi or wagami). The absence of creping means that these backings have lower extensibility. This is usually 3 to 10%, depending on the paper structure, fibre type and impregnating agent type. Examples in which backing papers have elongation values greater than 10% have also been disclosed in EP 2 159 321 A1.

The term "Japan paper" (or washi or wagami) has long been used in literature. However, apart from the description of the optical and haptic properties, there is no exact technical definition of this type of paper.

Japan paper is a traditionally handmade, translucent paper from Japan. Nowadays, papers having said optics/haptics are also produced industrially.

Japan paper is predominantly obtained from fibres from plants. The most well-known fibres that are traditionally used are those from gampi, kouzo and mitsumata. These result in a very tough, durable paper, as a consequence of the relatively long fibres. This is also due to the production procedure, since the bark of the plants is not cut up, but is comminuted by beating and tapping. Industrial production nowadays also uses pulp fibres obtained from coniferous and other woods and various synthetic fibres.

Adhesive tapes made of Japan paper have a number of advantages over conventional creped masking tapes. Firstly, the low thickness of the papers allows particularly flat paint edges to be achieved after painting over. What also plays a role here is that another specific paper property of this type, the lower bending stiffness compared to creped papers, makes it possible to realize adequate bonding reliability with lower adhesive strengths. This allows a significant reduction in the required adhesive coat weight compared to crepe adhesive tapes. The risk of adhesive residues and damage to surfaces is also minimized therewith.

A further advantage of the flat, uncreped paper backing is that it prevents paint from creeping underneath the tape, as can occur in crepe folds in creped papers. Adhesive masking tapes based on Japan paper are accordingly used to produce high-precision paint/lacquer edges.

Unlike crepe adhesive tapes, which are usually almost opaque, adhesive tapes based on Japan paper are very often at least semitransparent on account of their low thickness and homogeneous paper structure.

This gives the advantage of precise application in use (exact alignment with guide lines, for example).

A general problem with thin paper adhesive masking tapes is ensuring that the product is sufficiently impermeable. This applies to adhesive tapes based on both creped and uncreped papers.

Since one of the key advantages of adhesive tapes based on Japan paper is achieved by their low thickness, the focus of the design of such tapes is having a structure (paper+adhesive+any functional layers) that is as flat as possible.

Achieving sufficiently impermeability is therefore a particular challenge with such adhesive tapes.

Inadequate impermeability in a masking tape when painting over with paint or lacquer will be apparent to the user when the paint or lacquer partially penetrates through the tape onto the surface beneath. If this happens, highly undesirable dried paint residues that are usually laborious to remove are left behind after removing the tape from the surface to be protected.

It occurs because the backing papers of the adhesive tapes very often have cavities or capillaries that are incompletely filled even after impregnation and are not rendered impermeable by the adhesive layer applied to the underside of the backing.

Despite these problems being known to those skilled in the art, there are on the market some adhesive masking tapes that have inadequate impermeability.

To avoid the described phenomenon, the paper backing must be made as dense as possible by using either papers having a heavy grammage and/or a particularly homogeneous structure and/or a higher amount of impregnation. Another means of rendering the backing impermeable is to apply a barrier layer to the backing in addition to the impregnation.

However, opting for a heavy backing is undesirable on account of the consequent higher product costs, the accompanying decrease in adaptability and especially on account of the current trend in the adhesive masking tape sector in favour of products for high-quality painting work that provide the flattest-possible sharp-edged paint edges. The use of a barrier layer is likewise unfavourable, since it also increases costs and bending stiffness.

The other alternative, namely rendering a low-density backing completely impermeable with the adhesive layer to be applied, is scarcely possible when using the adhesive coat weights of between 20 and 50 g/m$^2$ that are typically used for adhesive masking tapes and traditional coating with adhesives dissolved/dispersed in solvent or water. In similar fashion to the impregnation process, the drying process here gives rise to capillaries or small cavities that reduce the impermeability to the paint applied.

Up to now, experts have assumed that resistance to colour penetration is essentially based on the physical properties of the backing material used (incl. taking into account an impregnation and coating with a release coating and optionally a further barrier layer (topcoat)).

In addition, adhesive masking tapes should be redetachable without leaving any residue.

The extent of this requirement is that even "ghosting" is not detectable.

"Ghosting" or "ghost images" are for the purposes of the invention understood as meaning very thin non-tacky coatings or deposits on a surface resulting in optical changes to the surface that are detectable to the eye. These coatings or deposits are caused by a covering of material that has previously been in contact with the surface. The coatings often cannot even be wiped off, but are visually perceptible when observing at a shallow angle against a light source. Ghosting is particularly easy to see on dark paint surfaces. Further details on the phenomenon of "ghosting" are described in US 2002/098353 A1.

The object of the present invention is to provide an acrylic pressure-sensitive adhesive that finds use especially in a reversible adhesive tape that is redetachable without leaving any residue, the adhesive tape having a particularly flat paper backing with a relatively open structure, that is to say a relatively high air permeability, and thus gives rise to particularly precise and flat paint edges when applied. At the same time, the penetration of applied paint or lacquer should be reliably prevented without the need for additional barrier coatings.

This object is achieved by an acrylic pressure-sensitive adhesive, as set out in the main claim, and by an adhesive tape that, together with advantageous developments of the subject matter of the invention, is the subject matter of the dependent claims. The invention additionally relates to proposals for the use of the adhesive tape of the invention.

The invention accordingly relates to an acrylic pressure-sensitive adhesive based on polymers having the following monomer composition:

a) 97% to 99% by weight of monomers from the group comprising 2-ethylhexyl acrylate or 2-octyl acrylate or n-heptyl acrylate or mixtures of at least two of said monomers or of all three said monomers, b) 1% to 3% by weight of (meth)acrylic acid and further comprising a crosslinking system, wherein the ratio of the reactive crosslinking groups and the carboxy groups of (meth)acrylic acid (b) is less than or equal to 7% and wherein the polymers are produced by emulsion polymerization.

"On the basis of", "based" or "based on" means in the present case that the properties of the polymer mixture are at least strongly determined by the basic properties of said polymer (the "base polymer"), the possibility of course not being excluded that that these properties are additionally influenced by the use of modifying auxiliaries or additives or of other polymers in the composition. In particular, this may mean that the proportion of the base polymer in the total mass of the polymeric phase is more than 50% by weight, preferably more than 70% by weight, further preferably more than 90% by weight, further preferably more than 95% by weight.

Monomeric acrylates are in the present case understood as meaning those in which the acrylate has one carbonyl group (C═O), such as preferably all monomeric acrylates having an optionally functionalized C═C—(C═O)— parent structure, i.e. acrylamides count as acrylates and acrylonitriles as ethylenically unsaturated comonomers.

Monomeric acrylates are mono-, di- and/or multifunctional acrylates.

The monomers 2-ethylhexyl acrylate, 2-octyl acrylate and n-heptyl acrylate preferably consist at least in part of renewable raw materials.

Further preferably, 2-octyl acrylate attains a maximum proportion in the monomer mixture of 85% by weight.

According to a preferred embodiment of the invention, methacrylic acid is used in polymer formation, preferably in a proportion of 2±0.5% by weight, more preferably in a proportion of 2% by weight.

The polymer dispersion is produced by the process of emulsion polymerization of the recited components. Descriptions of this process may be found for example in "Emulsion Polymerization and Emulsion Polymers" by Peter A. Lovell and Mohamed S. El-Aasser—Wiley-VCH 1997—ISBN 0-471-96746-7 or in EP 1 378 527 B1.

In the polymerization the possibility cannot be excluded that not all monomers are converted into polymers. Here, it is obvious that the residual monomer content should be as low as possible.

Preference is given to providing acrylic pressure-sensitive adhesives comprising the polymer dispersion with a residual monomer content of not more than 1% by weight, especially not more than 0.5% by weight (based on the mass of the base polymer).

A crosslinking system, i.e. compounds capable of crosslinking, is added to the acrylic pressure-sensitive adhesive.

As used here, the term crosslinking system or crosslinker refers to chemical compounds capable of connecting molecular chains to one another such that two-dimensional structures are able to form three-dimensional crosslinked structures through the formation of intermolecular bridges.

Crosslinkers are those compounds—especially bi- or polyfunctional compounds, usually of low molecular weight—that can react under the chosen crosslinking conditions with suitable groups—especially functional groups—of the polymers to be crosslinked and thus join two or more polymers or polymer sites to one another (form "bridges"), thereby creating a network from the polymer(s) to be crosslinked. This generally results in an increase in cohesion.

Typical examples of crosslinkers are chemical compounds that have two or more identical or different functional groups within the molecule or at both ends of the molecule and are thus able to crosslink molecules of the same or different structure. It is also possible for a crosslinker to react with the reactive monomer or reactive resin, as defined above, without a polymerization per se having taken place. This can result in the incorporation of a crosslinker into the polymer network.

In a preferred embodiment of the invention, the crosslinking system is selected from the group comprising multifunctional aziridines, epoxides, carbodiimides or oxazolines or mixtures thereof, preferably selected from the group comprising aziridines, epoxides or carbodiimides or mixtures thereof.

The crosslinking system is particularly preferably a polymeric aziridine having a molecular weight of greater than 1000 g/mol.

In particular, the acrylic pressure-sensitive adhesive contains no further polymers such as elastomers, i.e. the polymers of the acrylic pressure-sensitive adhesive consist only of the monomers in the recited quantity ratios.

The acrylic pressure-sensitive adhesive is a pressure-sensitive adhesive, i.e. an adhesive that even under relatively weak contact pressure allows permanent joining with almost any substrate and after use may be redetached from the substrate largely without leaving any residue. A pressure-sensitive adhesive has permanent pressure-sensitive adhesion at room temperature, i.e. has a sufficiently low viscosity and high tackiness to the touch, such that it wets the surface of the respective substrate even at low contact pressure. The bondability of the adhesive is based on its adhesive properties, and the redetachability is based on its cohesive properties.

For achievement of pressure-sensitive adhesive properties, the adhesive must at the processing temperature be above its glass transition temperature in order to have viscoelastic properties. Since the adhesive is used at normal ambient temperature (approximately between 15° C. to 25° C.), the glass transition temperature of the pressure-sensitive adhesive formulation is preferably below +15° C. (determined by DSC (differential scanning calorimetry) according to DIN 53765 at a heating rate of 10 K/min).

The glass transition temperature of the acrylate polymers can be estimated according to the Fox equation from the glass transition temperatures of the homopolymers and their relative ratios.

To achieve polymers, for example pressure-sensitive adhesive compositions or heat-sealing compositions, having desired glass transition temperatures, the quantitative composition of the monomer mixture is advantageously chosen so as to give the desired $T_G$ for the polymer according to an equation (G1) analogous to the Fox equation (cf. T. G. Fox, *Bull. Am. Phys. Soc.* 1956, 1, 123).

$$\frac{1}{T_G} = \sum_n \frac{w_n}{T_{G,n}} \qquad \text{(G1)}$$

Any addition of tackifying resins will by definition increase the glass transition temperature, this increase amounting to approx. 5 to 40 K depending on the amount added, compatibility and softening temperature.

Preference is accordingly given to acrylate copolymers having a glass transition temperature of not more than 0° C.

According to the invention, no further polymers are added to the acrylic pressure-sensitive adhesive in addition to the acrylic-based base polymer.

According to the invention, no tackifying resins are added to the acrylic pressure-sensitive adhesive.

A "tackifying resin", also referred to as a tackifier, is according to the general understanding of those skilled in the art understood as meaning an oligomeric or polymeric resin that increases autoadhesion (tack, intrinsic tackiness) of the pressure-sensitive adhesive compared to a pressure-sensitive adhesive that does not contain any tackifying resin but is otherwise identical.

The use of tackifying resins or tackifiers for increasing the adhesive strengths of pressure-sensitive adhesives is known in principle.

The acrylic pressure-sensitive adhesive of the invention may contain 1 to 10 parts by weight, preferably 3 to 7 parts by weight, more preferably 4 to 6 parts by weight, of tackifying resins, in each case based on 100 parts by weight of base polymer.

Suitable tackifying resins are in principle all known substance classes. Tackifying resins are for example hydrocarbon resins (for example polymers based on unsaturated $C_5$ or $C_9$ monomers), terpene-phenol resins, polyterpene resins based on raw materials such as α- or β-pinene, aromatic resins such as coumarone-indene resins or resins based on styrene or α-methylstyrene such as rosin and products obtained therefrom, for example disproportionated, dimerized or esterified rosin, for example reaction products with glycol, glycerol or pentaerythritol, to mention just a few. Preference is given to resins having no readily oxidizable double bonds, such as terpene-phenolic resins, aromatic resins and more preferably resins prepared by hydrogenation, for example hydrogenated aromatic resins, hydrogenated polycyclopentadiene resins, hydrogenated rosin derivatives or hydrogenated polyterpene resins.

Suitable resins are those based on terpene-phenols and rosin esters. Also suitable are resins based on terpene-phenols and rosin esters having a softening point above 100° C. according to ASTM E28-99 (2009). The resins are advantageously employed in the form of dispersions. This makes them amenable to mixing with the polymer dispersion in a finely divided state. According to the invention, these adhesive resins are not excluded, but are preferably omitted. Alongside the acrylic-based base polymer, additives such as light stabilizers or ageing stabilizers may also be added to the acrylic pressure-sensitive adhesive in the amounts mentioned below.

The adhesive formulation may for example optionally be blended with light stabilizers or primary and/or secondary aging stabilizers. Preferably, the acrylic pressure-sensitive adhesive of the invention does not include any such additives in the form of light stabilizers or primary and/or secondary aging stabilizers. Ageing stabilizers used may be products based on sterically hindered phenols, phosphites, thio synergists, sterically hindered amines or UV absorbers. Suitable for use are primary antioxidants, for example Irganox 1010 or Irganox 254, alone or in combination with secondary antioxidants, for example Irgafos TNPP or Irgafos 168. The ageing stabilizers may be used in any combination with one another, mixtures of primary and secondary antioxidants in combination with light stabilizers, for example Tinuvin 213, showing particularly good anti-ageing action.

Suitable ageing stabilizers are also those in which a primary antioxidant is combined with a secondary antioxidant in the same molecule. These ageing stabilizers are cresol derivatives in which the aromatic ring is substituted by thioalkyl chains at any two different positions, preferably in the ortho and meta position to the OH group, where the sulfur atom may also be attached to the aromatic ring of the cresol unit via one or more alkyl chains. The number of carbon atoms between the aromatic system and the sulfur atom may be between 1 and 10, preferably between 1 and 4. The number of carbon atoms in the alkyl side chain may be between 1 and 25, preferably between 6 and 16. Particular preference is given here to compounds of the 4,6-bis(dodecylthiomethyl)-o-cresol, 4,6-bis(undecylthiomethyl)-o-cresol, 4,6-bis(decylthiomethyl)-o-cresol, 4,6-bis(nonylthiomethyl)-o-cresol or 4,6-bis(octylthiomethyl)-o-cresol type. Ageing stabilizers of this kind are supplied for example by Ciba Geigy under the Irganox 1726 or Irganox 1520 name.

The amount of aging stabilizer or aging stabilizer package added should be within a range of between 0.1 and 5 parts by weight based on the mass of the base polymer, preferably within a range of between 0.2 and 3 parts by weight based on the mass of the base polymer, more preferably within a range of between 0.5 and 2 parts by weight based on the mass of the base polymer.

To improve the processing properties, the adhesive formulation may also have been blended with customary processing auxiliaries such as defoamers, deaerating agents, wetting agents or levelling agents. Suitable concentrations are in the range of from 0.1 to 5 parts by weight based on the mass of the base polymer. Preferably, the acrylic pressure-sensitive adhesive of the invention does not include any such additives.

The shear viscosities of commercial dispersions are generally too low. To achieve the necessary shear viscosities for the selected coating application process, rheology additives, also referred to as thickeners, are generally employed.

According to a preferred embodiment, a rheology additive is added to the polymer dispersion such that the polymer dispersion before drying has a viscosity of 0.5 Pa*s to 5 Pa*s at a shear rate of 10/s.

Preferably, the polymer dispersion before drying has a viscosity of 1.0 Pa*s to 2.0 Pa*s at a shear rate of 10/s.

According to a preferred variant of the invention, the pressure-sensitive adhesive compound contains between 0.1 to 5 parts by weight of thickeners based on the mass of the base polymer.

A basic distinction is made here between organic and inorganic rheology additives. The organic thickeners may in turn be divided into two essential operating principles: (i) thickening of the aqueous phase, i.e. non-associating, and (ii) association between the thickener molecule and particles, in some cases with involvement of the stabilizers (emulsifiers). Representatives of the first (i) substance class are water-soluble polyacrylic acids and polycoacrylic acids that in basic media form polyelectrolytes of high hydrodynamic volume. Those skilled in the art also refer to these as ASE (alkali swellable emulsion) for short. They are characterized by high shear viscosities and strong shear thinning. Another substance class are the modified polysaccharides, especially cellulose ethers such as carboxymethylcellulose, 2-hydroxyethylcellulose, carboxymethyl 2-hydroxyethylcellulose, methylcellulose, 2-hydroxyethyl methylcellulose, 2-hydroxyethyl ethylcellulose, 2-hydroxypropylcellulose, 2-hydroxypropyl methylcellulose and 2-hydroxybutyl methylcellulose. This substance class also includes less common polysaccharides such as starch derivatives and special polyethers.

The active group of (ii) associative thickeners is in principle block copolymers having a water-soluble middle block and hydrophobic end blocks, where the end blocks interact with the particles or with one another, thereby forming a spatial network involving the particles. Typical representatives are familiar to those skilled in the art as HASE (hydrophobically-modified alkali swellable emulsion), HEUR (hydrophobically-modified ethylene oxide urethane) or HMHEC (hydrophobically-modified hydroxyethyl cellulose). In HASE thickeners, the middle block is an ASE and the end blocks are usually long, hydrophobic alkyl chains coupled via polyethylene oxide bridges. In HEUR, the water-soluble middle block is a polyurethane and in HMHEC it is a 2-hydroxyethylcellulose. The nonionic HEUR and HMHEC in particular are largely insensitive to pH.

Associative thickeners give rise to varyingly Newtonian (shear rate-independent) or pseudoplastic (shear-liquefying) flow behaviour, depending on their structure. They occasionally also exhibit thixotropic character, i.e. viscosity that is dependent not just on shear force but also on time.

The inorganic thickeners are usually sheet silicates of natural or synthetic origin, examples being hectorites and smectites. In contact with water, the individual layers detach from one another. At rest, different charges on surfaces and edges of the platelets lead to the formation of a space-filling “house-of-cards” structure that results in high resting shear viscosities up to the yield point. On shearing, the house-of-cards structure collapses and a marked fall in shear viscosity is observed. Depending on the charge, concentration and geometrical dimensions of the platelets, this structure can take some time to develop, which means that with inorganic thickeners of this kind it is also possible to achieve thixotropy.

The thickeners can in some cases be stirred directly into the adhesive dispersion or are in some cases advantageously predispersed or prediluted in water beforehand.

Examples of suppliers of thickeners are OMG Borchers, Omya, Byk, Dow Chemical Company, Evonik or Munzing Chemie.

The invention also provides an adhesive tape comprising a backing, preferably paper backing, and—applied to at least one side of the backing—an acrylic pressure-sensitive adhesive of the invention in the form of a dried polymer dispersion.

Backing papers are in particular used as the backing, particularly in the likewise preferred adhesive masking tapes.

A paper backing that is according to the invention advantageously employed is washi paper.

In an advantageous embodiment of the invention, the basis weight of the paper (without taking into account any impregnation or lacquering with a release coating) is 20 and 250 $g/m^2$, preferably 20 to 50 $g/m^2$, preferably 25 to 35 $g/m^2$.

According to advantageous embodiments of the invention, the impregnated paper backing has the following properties:

(a) input of impregnation agent of between 5 and 25 $g/m^2$, preferably 9 and 20 $g/m^2$, (b) thickness of between 50 μm and 90 μm, preferably between 60 μm and 80 μm, (c) elongation at break of between 3 and 13%, preferably between 5 and 11% and/or (d) air permeability of less than 20 $l/m^2s$, preferably less than 5 $l/m^2s$.

It should at this point be stressed that the preferred embodiments of the invention also include variants in which just one feature or a combination of just two of the preferred features is realized, while the other features are not within the preferred ranges, for example a paper backing in which just features (a) and (b) are realized, a paper backing in which just features (a) and (c) are realized, etc.

The invention does of course also encompass the variants in which three of the preferred features are present at the same time, for example a paper backing in which features (a), (b) and (c) are realized, or a paper backing in which features (a), (b) and (d) are realized, etc.

The invention does of course additionally also encompass the variants in which all four of the preferred features are present at the same time, for example a paper backing in which features (a), (b), (c) and (d) are realized.

To increase strength and ensure a minimum impermeability, especially in wet conditions, the papers are furnished with an impregnation before further processing into adhesive tape. This can be done using commercially available impregnating agents or a combination thereof, for example aqueous dispersions of a carboxyl-group-containing acrylic ester copolymer or of a styrene-butadiene copolymer, where the styrene-butadiene copolymer may also contain carboxyl groups. Also suitable are impregnating agents based on acrylonitrile-butadiene copolymers or styrene-acrylic ester copolymers. The basis weight of the input of impregnating agent (dry) may be between 5 $g/m^2$ and 25 $g/m^2$, but advantageously between 9 $g/m^2$ and 20 $g/m^2$.

According to a further advantageous embodiment of the invention, a release agent is applied directly to the reverse side of the paper backing, i.e. on the side opposite to the adhesive compound, in order to thus give rise to anti-adhesive properties. Unwinding the adhesive tape, which is usually wound into an Archimedean spiral, is made easier, and the adhesive remains on the underside of the adhesive tape, i.e. on the side on which the adhesive was originally embedded. An undesired transfer of the adhesive compound to the reverse side during unwinding—known to those skilled in the art as rewinding of the adhesive—is not possible.

A distinction is made between three main types of release agents, also referred to as release coatings:

Firstly, there are release agents based on long-chain alkyl groups. Examples are polyvinyl stearyl carbamates, polyethyleneimine stearyl carbamates, chromium complexes of $C_{14}$ to $C_{28}$ fatty acids, and stearyl copolymers (described for example in DE 28 45 541 A).

There also exist acrylic polymers having perfluorinated alkyl groups (U.S. Pat. No. 3,318,852 A), which are applied in latex form or from solvents.

The appropriate release agent is selected according to the use in the particular case.

The coat weight (coating thickness) of the adhesive is between 20 and 200 $g/m^2$, preferably 20 and 50 $g/m^2$, more preferably between 25 and 40 $g/m^2$, and particularly preferably between 30 and 35 $g/m^2$.

The production process for the adhesive tape of the invention involves the direct coating of the backing with the dispersion in one or more successively executed operations.

The usual application devices are used: wire doctor blade, coating bar, roller application, jet coating, double-chamber doctor blade, multiple cascade jet.

The adhesive tape of the invention is formed by the adhesive being applied to part or all of the surface on one side of the backing. The coating can also be effected in the form of one or more strips in the longitudinal direction (machine direction), optionally in the transverse direction, but especially covering the entire surface. The adhesives may also be applied in a raster pattern by means of screen printing, where the adhesive dots may also be of variable size and/or variable distribution, by gravure printing in the longitudinal and transverse direction of continuous webs, by halftone printing or by flexo printing. The adhesive may be present in calotte form (produced by screen printing) or else in a different pattern such as grids, strips or zigzag lines. In addition, it can for example also be sprayed, which results in a varyingly irregular application pattern.

According to an advantageous embodiment of the invention, the adhesive tape consists of the following layers:

- an impregnated paper backing,
- an acrylic pressure-sensitive adhesive applied to the underside of the paper backing with a coat weight of between 20 and 200 $g/m^2$, preferably 20 to 50 $g/m^2$, preferably of between 20 and 40 $g/g/m^2$,
- a release agent/release layer on the upper side of the paper backing and
- an adhesion promoter/primer layer on the underside of the paper backing.

No additional functional or barrier layer is employed in the adhesive tape in addition to the functional layers mentioned above.

The adhesive tape of the invention may be covered with a liner. The liner for the product or the process liner is for example a release paper or a release film, preferably having a silicone coating. Useful backings include for example films made of polyester or polypropylene or calendered papers with or without dispersion coating or polyolefin coating.

A liner (release paper, release film) is not part of an adhesive tape, but merely an auxiliary for the production and/or storage thereof or for further processing by die-cutting. Moreover, a liner, by contrast with an adhesive tape backing, is not firmly bonded to an adhesive layer.

Preferably, the adhesive tape furnished with a paper backing is used as a masking tape, for example in painting processes. The tape of the invention can be used particularly advantageously by professional or hobby painters indoors and—if the adhesive is formulated to be appropriately weather-resistant and UV-resistant—outdoors, for example for painting facades, for door or window work or for other high-quality painting work.

The adhesive tape is accordingly advantageously used for the temporary masking of a surface during a painting process.

The adhesive tape of the invention can of course also be used in the commercial painting of vehicles, i.e. both in repair shops and at vehicle production sites.

In the context of the present invention the general expression "adhesive tape" encompasses all sheet-like structures such as films or film sections extending in two dimensions, tapes having extended length and limited width, tape sections and the like, and lastly also blanks (die-cut, cut preferably with lasers) or labels.

The adhesive tape thus has a longitudinal extent and a lateral extent. The adhesive tape also has a thickness running perpendicular to the two extents, the lateral extent and longitudinal extent being many times greater than the thickness. The thickness is very substantially the same, preferably exactly the same, over the entire areal extent of the adhesive tape determined by its length and width.

The adhesive tape is more particularly in the form of a sheeting web. A sheeting web is to be understood as meaning an object having a length many times greater than its width, where the width remains roughly and preferably exactly the same over the entire length.

The adhesive tape may be produced in the form of a roll, i.e. in the form of a rolled-up Archimedean spiral.

The adhesive may be applied in the longitudinal direction of the adhesive tape in the form of a strip that is less wide than the adhesive tape backing.

Depending on the intended use, the backing material may be coated with two or more parallel strips of the adhesive.

The position of the strip on the backing can be freely chosen, although it is preferably arranged directly on one of the edges of the backing.

Preferably, the adhesive is applied over the entire surface of the backing.

The adhesive tape shall be elucidated in more detail hereinbelow with reference to a FIGURE, without wishing to give rise to a restriction of any kind.

FIG. 1 shows the adhesive tape in a lateral section.

In FIG. 1 the adhesive tape is shown in a section in cross direction (cross section), the tape consisting of a paper backing 1 to which a layer of an acrylic pressure-sensitive adhesive 2 has been applied on one side.

Before the invention is illustrated by means of examples, the measurement methods used will be described.

Measurement Methods

Immediate Adhesive Strength

The adhesive strength (according to AFERA 5001) was determined as follows. The substrates used were a PVC plate (Kömadur H white 654 from Thyssen Krupp Plastics GmbH), an aluminium plate (alloy 5005A (AlMg1), anodized E6EV1 from Rocholl GmbH) and a commercially available 600 grit sandpaper. For the determination of the adhesive strength, the adhesive tape to be examined was cut to a width of 20 mm and a length of 25 cm, provided with a handling section and immediately thereafter in five replicate determinations pressed onto the relevant substrate with a 4 kg steel roller at an advance rate of 10 m/min. Immediately thereafter, the bondable sheet element was removed from the substrate at an angle of 180° using a tensile tester (from Zwick) at a pull-off rate of v=300 mm/min and the force necessary for this was measured under normal climatic conditions (23±1° C., 50±5% rel. humidity). The measured value (in N/cm) was the mean value of three individual measurements.

For an adhesive masking tape, adhesive strength values of 1.7 to 2.2 N/cm on both PVC and aluminium are considered optimal and thus in accordance with the invention.

Adhesive strength values outside these limits describe an unsuitable adhesive tape.

On sandpaper, the masking tape of the invention should have a value greater than 0.6 N/cm in order to be suitable. Values below 0.6 N/cm describe an unsuitable adhesive tape.

Adhesive Strength after Storage

In addition, the peeling behaviour of the examined adhesive tapes was investigated (adhesive strength after storage).

For the determination of the peeling behaviour, the adhesive tape to be examined was cut to a width of 20 mm and a length of 25 cm, provided with a handling section and immediately thereafter in five replicate determinations pressed onto the relevant substrate (PVC and anodized aluminium) with a 4 kg steel roller at an advance rate of 10 m/min. The plates were then stored in the climatic chamber for four days (96 hours) at 60° C. and 95% relative humidity. After the climate-controlled storage, the plates were reconditioned for at least 8 hours under normal climatic conditions (23±1° C., 50±5% rel. humidity) and the peel-off force after application then determined in analogous manner to the above-described adhesive strength test using a tensile tester and the arithmetic mean (in N/cm) of three individual measurements calculated.

Peeling Factor

To evaluate the peeling behaviour, the "peeling factor" is determined. This is calculated as the ratio of the adhesive strength after storage on the respective substrate (PVC or anodized aluminium) divided by the immediate adhesive force. For compositions of the invention this dimensionless factor is less than 1.65, which corresponds to a very low tendency to peeling.

Ghosting

For the visual evaluation of residues or ghosting, the adhesive tapes to be examined are stuck to the PVC plate and the aluminium plate in a width of 20 mm and a length of 25 cm. The adhesive tape is removed from the paint surface at an angle of 180° and at a rate of 300 mm/min. The paint surface is then visually assessed for residues at a shallow angle of 45° against a light source according to the following criteria:

- G1: Clean, no residues, no visible ghosting under normal indoor light and at an angle of 45° to the vertical direction
- G2: Clean, no residues, visible ghosting
- G3: Clean, residues, visible ghosting
- G4: Not clean, residues, visible ghosting Rolling Ball Tack The rolling ball tack was measured according to the PSTC-6 method (Test Methods for Pressure Sensitive Adhesive Tapes, 15th Edition; publisher: Pressure Sensitive Tape Council, Northbrook (Illinois), USA) with the following modifications:

- Use of stainless steel ball bearings (stainless steel 1.4401), diameter 7⁄16 in., mass 5.7 g.
- Preparation of the balls: Thorough cleaning with cellulose and acetone: the clean balls are stored in an acetone bath for 15 min before the measurement series (balls are completely immersed in acetone). At least 30 min before the start of the measurement, the balls are taken out of the acetone bath and conditioned by open storage under normal climatic conditions (23±1° C., 50±5% rel. humidity).

Each ball is used for one measurement only.

The tackiness to the touch was determined as follows: As a measure of the tackiness to the touch at very short contact times, the so-called "rolling ball tack" was measured. An approximately 30 cm long strip of the adhesive tape was horizontally fastened under tension to the test surface with the adhesive side facing upwards. For the measurement, the steel ball was accelerated under the earth's gravitational field by rolling down a 65 mm high ramp (angle of inclination: 21°). From the ramp, the steel ball was directed directly onto the adhesive surface of the sample. The distance travelled on the adhesive until the ball came to a standstill was measured. The roll path length thus determined serves as an inverse measure of the tackiness to the touch of the self-adhesive composition (i.e. the shorter the roll distance, the higher the tackiness to the touch and vice versa). The measured value (as a length in mm) was in each case the mean value of five individual measurements on in each case five different strips of the adhesive tape.

Values of less than 50 mm for an adhesive masking tape in the rolling ball test are considered optimal here and thus in accordance with the invention.

RBT values outside these limits describe an unsuitable adhesive tape.

Elongation at Break

The elongation at break is determined according to the AFERA 5004 test method.

Air Permeability

The air permeability is determined in accordance with EN ISO 9237. The measurement area is 20 $cm^2$ and a test pressure of 2500 Pa is employed. The test samples are conditioned in accordance with DIN 53802 and ASTM D 1776. The Tester FX3300 air permeability tester from Textest Instruments was used for the actual test. In this test, the measured air permeability should be less than 20 $l/m^2s$, preferably <5 $l/m^2s$.

Molecular Weight

The molecular weight, as the number-average molecular weight $M_n$ and weight-average molecular weight $M_w$, is determined by gel-permeation chromatography (GPC). THF (tetrahydrofuran) containing 0.1% by volume of trifluoroacetic acid is used as eluent. The measurement is carried out at 23° C. A PSS-SDV, 10μ, $10^3$ Å, ID 8.0 mm×50 mm guard column is used. The columns used for the separation are PSS-SDV, 10μ, $10^3$ Å, $10^5$ Å and $10^7$ Å, each having ID 8.0 mm×300 mm. The sample concentration is 0.5 g/l, the flow rate 0.5 ml per minute. The calibration is determined using the commercially available ReadyCal kit poly(styrene) high from PSS Polymer Standard Service GmbH, Mainz. This is converted into polymethyl methacrylate (PMMA) using the Mark-Houwink parameters K and alpha universal, so that the data are expressed in PMMA mass equivalents.

Viscosity Measurement

Viscosity is measured using an ARES rheometer (Rheometric Scientific) at room temperature and at a shear rate of 10 $s^{-1}$ with a cone-plate system having a diameter of 50 mm.

EXAMPLES

The adhesive tape of the invention is described hereinbelow in a preferred embodiment with reference to examples, without wishing therewith to subject the invention to any restriction.

Also given are comparative examples representing unsuitable adhesive tapes.

To elucidate the inventive concept, polymer dispersions having the specified composition were tested.

The sample adhesive tapes are produced according to the following scheme:

Depending on the example, the polymer dispersions are optionally mixed with a crosslinker before coating. This is incorporated with the aid of a beaker agitator at moderate shear. For better coatability, the basic formulation thus prepared is then adjusted with a rheology additive (Borchi-Gel 0625, OMG Borchers) to a viscosity of 1000 mPa*s at a shear rate of 10 $s^{-1}$. The thickened samples are applied with a wire doctor blade to an impregnated washi paper (with a grammage of 50 $g/m^2$) so as to obtain, after drying for 5 min at 105° C., a coating basis weight of approx. 30 $g/m^2$.

TABLE 1

Monomer composition (values are in each case in wt %)

| Monomer | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| 2-Ethylhexyl acrylate | 98 | | | 40 | | 30 | 98 | 99 | 97 | | | 85 | 40 | 97 | 91 | 93 |
| 2-Octyl acrylate | | 98 | | 58 | 84 | 38 | | | | | | | 40 | | | |
| N-Heptyl acrylate | | | 98 | | 14 | 30 | | | | | | | | | | |
| N-Octyl acrylate | | | | | | | | | | 98 | | | | | | |
| N-Butyl acrylate | | | | | | | | | | | 98 | | | 2 | | |
| Acrylonitrile | | | | | | | | | | | | | | 1 | | 3 |
| Acrylic acid | | | | | | | 2 | | | | 2 | | 2 | | 1 | 4 |
| Methacrylic acid | 2 | 2 | 2 | 2 | 2 | 2 | | 1 | 3 | 2 | | | | | | |
| Methyl methacrylate | | | | | | | | | | | | 7 | 8 | | 8 | |
| Vinyl acetate | | | | | | | | | | | | 6 | 8 | | | |
| Styrene | | | | | | | | | | | | 2 | | | | |
| Hydroxyethyl acrylate | | | | | | | | | | | | | 2 | | | |

TABLE 1

| Formulation | | | |
|---|---|---|---|
| | Polymer | Crosslinker | Formulation |
| Counterexample 1 | P1 | 0 wt % crosslinker | F1a |
| Counterexample 2 | P1 | 1 wt % aziridine | F1b |
| Counterexample 3 | P1 | 0.25 wt % epoxy | F1c |
| Counterexample 4 | P10 | 0.25 wt % aziridine | F8a |
| Counterexample 5 | P11 | 0.25 wt % aziridine | F9a |
| Counterexample 6 | P12 | 0.25 wt % aziridine | F10a |
| Counterexample 7 | P13 | 0.25 wt % aziridine | F11a |
| Counterexample 8 | P14 | 0.25 wt % aziridine | F12a |
| Counterexample 9 | P15 | 0.25 wt % aziridine | F13a |
| Counterexample 10 | P16 | 0.25 wt % aziridine | F14a |
| Example 1 | P1 | 0.1 wt % aziridine | F1d |
| Example 2 | P1 | 0.25 wt % aziridine | F1e |
| Example 3 | P1 | 0.1 wt % epoxy | F1f |
| Example 4 | P2 | 0.25 wt % aziridine | F2a |

TABLE 1-continued

| Formulation | | | |
|---|---|---|---|
| | Polymer | Crosslinker | Formulation |
| Example 5 | P3 | 0.25 wt % aziridine | F3a |
| Example 6 | P4 | 0.25 wt % aziridine | F4a |
| Example 7 | P5 | 0.25 wt % aziridine | F5a |
| Example 8 | P6 | 0.25 wt % aziridine | F6a |
| Example 9 | P7 | 0.25 wt % aziridine | F7a |
| Example 10 | P8 | 0.25 wt % aziridine | F8a |
| Example 11 | P9 | 0.25 wt % aziridine | F9a |

The epoxy crosslinker used is Erisys GA-240 (N,N,N',N'-tetrakis(2.3-epoxypropyl)-m-xylene-alpha,alpha'-diamine from Emerald Performance Materials). The aziridine crosslinker used is NeoAdd PAX-521: multifunctional polymeric aziridine crosslinker from Covestro Deutschland AG.

| | | Formulation | | | | | |
|---|---|---|---|---|---|---|---|
| | | F1a | F1b | F1c | F1d | F1e | F1f |
| | | Crosslinker | | | | | |
| | | without | PAX-521 (poly-aziridine) | GA-240 (epoxy) | PAX-521 (poly-aziridine) | PAX-521 (poly-aziridine) | GA240 (epoxy) |
| | | Crosslinker % | | | | | |
| SParameter | | 0 | 1 | 0.25 | 0.1 | 0.25 | 0.3 |
| Adhesive specifications Immediate adhesive strength, 180°, PVC | | | | | | | |
| 300 mm/min | 1.7-2.2 | **2.51** | 2.03 | **1.51** | 2.18 | 2.15 | 2.20 |
| ALU | | — | | — | | | |
| 300 mm/min | 1.7-2.2 | **2.25** | 1.83 | **1.39** | 2.04 | 1.95 | 2.00 |
| Sandpaper 600 grit | | | | — | | | |
| 300 mm/min | >0.6 | 1.19 | **0.52** | **0.39** | 0.82 | 0.80 | 1.10 |
| Adhesive strength after storage 60° C./95% RH 96 h PVC | | | | | | | |
| 300 mm/min | <4 | 3.61 | 3.19 | 2.43 | 3.55 | 3.45 | 3.23 |
| Peeling factor (adhesive strength after storage/immediate adhesive strength) | <1.65 | 1.44 | 1.57 | 1.61 | 1.63 | 1.60 | 1.47 |
| | G1-G4 | G1 | G1 | G1 | G1 | G1 | G1 |
| ALU | | | | | | | |
| 300 mm/min | <4 | 3.43 | 2.63 | 2.11 | 3.25 | 3.04 | 2.91 |
| Peeling factor (adhesive strength after storage/immediate adhesive strength) | <1.65 | 1.52 | 1.44 | 1.52 | 1.59 | 1.56 | 1.46 |
| | G1-G4 | G1 | G1 | G1 | G1 | G1 | G1 |
| Rolling ball tack | | | | | | | |
| Average RBT (mm) | <50 | 14.8 | 20 | 21.8 | 16.2 | 16.8 | 18.4 |

-continued

| | | Formulation | | | | | | | |
|---|---|---|---|---|---|---|---|---|---|
| | | F2a | F3a | F4a | F5a | F6a | F7a | F8a | F9a |
| | | Crosslinker | | | | | | | |
| | | PAX-521 (poly-aziridine) | PAX-521 (poly-aziridine) | PAX-521 (poly-aziridine) | PAX-521 (poly-aziridine) | PAX-521 (poly-aziridine) | PAX-521 (poly-aziridine) | PAX-521 (poly-aziridine) | PAX-521 (poly-aziridine) |
| | | Crosslinker % | | | | | | | |
| SParameter | | 0.25 | 0.25 | 0.25 | 0.25 | 0.25 | 0.25 | 0.25 | 0.25 |
| Adhesive specifications Immediate adhesive strength, 180° PVC | | | | | | | | | |
| 300 mm/min | 1.7-2.2 | 2.07 | 2.10 | 2.08 | 2.18 | 2.12 | 2.16 | 2.02 | 2.18 |
| ALU | | | | | | | | | |
| 300 mm/min | 1.7-2.2 | 1.83 | 1.96 | 1.79 | 1.78 | 1.89 | 2.02 | 1.91 | 2.07 |
| Sandpaper 600 grit | | | | | | | | | |
| 300 mm/min | >0.6 | 0.95 | 1.45 | 0.99 | 0.86 | 0.84 | 0.91 | 0.82 | 0.85 |
| Adhesive strength after storage 60° C./95% RH 96 h PVC | | | | | | | | | |
| 300 mm/min | <4 | 2.99 | 3.46 | 3.05 | 3.02 | 3.21 | 3.18 | 3.29 | 3.50 |
| Peeling factor (adhesive strength after storage/immediate adhesive strength) | <1.65 | 1.44 | 1.65 | 1.47 | 1.39 | 1.51 | 1.47 | 1.63 | 1.61 |
| | G1-G4 | G1 | G1 | G1 | G1 | G1 | G1 | G1 | G1 |
| ALU | | | | | | | | | |
| 300 mm/min | <4 | 2.51 | 2.69 | 2.79 | 2.47 | 2.84 | 3.09 | 3.00 | 3.27 |
| Peeling factor (adhesive strength after storagef immediate adhesive strength) | <1.65 | 1.37 | 1.37 | 1.56 | 1.39 | 1.50 | 1.53 | 1.57 | 1.58 |
| | G1-G4 | G1 | G1 | G1 | G1 | G1 | G1 | G1 | G1 |
| Rolling ball tack | | | | | | | | | |
| Average RBT (mm) | <50 | 21.2 | 22 | 19.3 | 24.7 | 21.1 | 18.6 | 17.4 | 19.5 |

| | | Formulation | | | | | | | |
|---|---|---|---|---|---|---|---|---|---|
| | | F2a | F3a | F4a | F5a | F6a | F7a | F8a | F9a |
| | | Crosslinker | | | | | | | |
| | | PAX-521 (poly-aziridine) | PAX-521 (poly-aziridine) | PAX-521 (poly-aziridine) | PAX-521 (poly-aziridine) | PAX-521 (poly-aziridine) | PAX-521 (poly-aziridine) | PAX-521 (poly-aziridine) | PAX-521 (poly-aziridine) |
| | | Crosslinker % | | | | | | | |
| SParameter | | 0.25 | 0.25 | 0.25 | 0.25 | 0.25 | 0.25 | 0.25 | 0.25 |
| Adhesive specifications Immediate adhesive strength, 180° PVC | | | | | | | | | |
| 300 mm/min | 1.7-2.2 | 2.07 | 2.10 | 2.08 | 2.18 | 2.12 | 2.16 | 2.02 | 2.18 |
| ALU | | | | | | | | | |
| 300 mm/min | 1.7-2.2 | 1.83 | 1.96 | 1.79 | 1.78 | 1.89 | 2.02 | 1.93 | 2.07 |
| Sandpaper 600 grit | | | | | | | | | |
| 300 mm/min | >0.6 | 0.95 | 1.45 | 0.99 | 0.86 | 0.84 | 0.91 | 0.82 | 0.85 |
| Adhesive strength after storage 60° C./ | | | | | | | | | |

-continued

| | | | | | | | | | |
|---|---|---|---|---|---|---|---|---|---|
| 95% RH 96 h PVC | | | | | | | | | |
| 300 mm/min | <4 | 2.99 | 3.46 | 3.05 | 3.02 | 3.21 | 3.18 | 3.29 | 3.50 |
| Peeling factor (adhesive strength after storage/ immediate adhesive strength) | <1.65 | 1.44 | 1.65 | 1.47 | 1.39 | 1.51 | 1.47 | 1.63 | 1.61 |
| | G1-G4 | G1 | G1 | G1 | G1 | G1 | G1 | G1 | G1 |
| ALU | | | | | | | | | |
| 300 mm/min | <4 | 2.51 | 2.69 | 2.79 | 2.47 | 2.84 | 3.09 | 3.00 | 3.27 |
| Peeling factor (adhesive strength after storage/ immediate adhesive strength) | <1.65 | 1.37 | 1.37 | 1.56 | 1.39 | 1.50 | 1.53 | 1.57 | 1.58 |
| | G1-G4 | G1 | G1 | G1 | G1 | G1 | G1 | G1 | G1 |
| Rolling ball tack | | | | | | | | | |
| Average RBT (mm) | <50 | 21.2 | 22 | 19.3 | 24.7 | 21.1 | 18.6 | 17.4 | 19.5 |

In the tables above, values that are outside the appropriate parameter ranges specified by the invention are shown in bold and underlined.

Examples 1 to 3 show that the monomers claimed according to the invention in combination with the amount of crosslinkers claimed according to the invention result in adhesive tapes having excellent suitability as adhesive masking tape.

Counterexample 1 is not crosslinked, the peel-off forces are much too high.

Counterexample 2 is too highly crosslinked, consequently an adequate adhesive strength is not achieved on sandpaper.

Counterexample 3 is crosslinked with an unsuitable crosslinker.

Examples 3 to 11 also reflect that the fact that suitable monomers with a suitable crosslinker in a suitable amount result in an adhesive that can be used in an adhesive masking tape that meets all requirements.

All counterexamples 4 to 10 fail in respect of the peel-off force from PVC.

In addition, almost all counterexamples show ghosting from G2 to G4.

The adhesive masking tape of the invention is intended in particular for use in the painting process for vehicles such as automobiles or for parts thereof such as bumpers, motorcycle tanks, etc. It is used to create sharp paint edges and is suitable for use on flat and highly curved surfaces and for sticking around very tight curves. The adhesive masking tape of the invention is distinguished by not leaving behind any residues and no ghosting on masked critical paint surfaces, even after high thermal stress.

The invention claimed is:

1. An acrylic pressure-sensitive adhesive based on polymers having the following monomer composition:

(a) 97% to 99% by weight of monomers from the group comprising 2-ethylhexyl acrylate or 2-octyl acrylate or n-heptyl acrylate or mixtures of at least two of said monomers, (b) 1% to 3% by weight of (meth)acrylic acid:

wherein the adhesive further comprises a crosslinking system having reactive crosslinking groups that is added to the polymer dispersion after said polymers are produced by emulsion polymerization, and wherein the ratio of the reactive crosslinking groups and the carboxy groups of (meth)acrylic acid (b) is less than or equal to 7%.

2. The acrylic pressure-sensitive adhesive according to claim 1, wherein the 2-octyl acrylate attains a maximum proportion in the monomer mixture of 85% by weight.

3. The acrylic pressure-sensitive adhesive according to claim 1, wherein the methacrylic acid is used in polymer formation, in a proportion of 2±0.5% by weight.

4. The acrylic pressure-sensitive adhesive according to claim 1, wherein the crosslinking system is selected from the group consisting of: multifunctional aziridines, epoxides, carbodiimides, oxazolines and mixtures thereof.

5. The acrylic pressure-sensitive adhesive according to claim 4, wherein the crosslinking system is selected from the group consisting of: aziridines, epoxides, carbodiimides and mixtures thereof.

6. The acrylic pressure-sensitive adhesive according to claim 5, wherein the crosslinking system is a polymeric aziridine having a molecular weight of greater than 1000 g/mol.

7. The acrylic pressure-sensitive adhesive according to claim 4, wherein the crosslinking system is selected from the group consisting of: multifunctional aziridines, epoxides, carbodiimides, and mixtures thereof.

8. An adhesive tape comprising a backing, having applied to at least one side of the backing the acrylic pressure-sensitive adhesive according to claim 1 in the form of a dried polymer dispersion.

9. The adhesive tape according to claim 8, wherein the coat weight of the acrylic pressure-sensitive adhesive on the backing, is between 20 and 200 $g/m^2$.

10. The adhesive tape according to claim 9, wherein the coat weight of the acrylic pressure-sensitive adhesive on the backing, is between 20 and 50 $g/m^2$.

11. The adhesive tape according to claim 8, wherein the basis weight of the paper and taking into account any impregnation or lacquering with a release coating is 25 to 250 $g/m^2$, and/or the thickness is between 50 and 200 μm.

12. The adhesive tape according to claim 11 wherein the basis weight of the paper and taking into account any impregnation or lacquering with a release coating is 40 to 200 $g/m^2$, and/or the thickness is between 50 and 200 μm.

13. The adhesive tape according to claim 11 wherein the basis weight of the paper and taking into account any impregnation or lacquering with a release coating is 25 to 250 $g/m^2$, and/or the thickness is between 50 and 90 μm.

14. The adhesive tape according to claim 8, characterized in by exhibiting at least one of:

(a) input of impregnation agent is between 5 and 25 $g/m^2$, (b) the thickness is between 50 μm and 90 μm, (c) the elongation at break is between 3 and 13%, (d) the air permeability is less than 20 $l/m^2s$.

15. The adhesive tape according to claim 14, characterized in by exhibiting at least one of:

(a) input of impregnation agent is between 9 and 20 $g/m^2$;

(b) the thickness is between 60 μm and 80 μm;

(c) the elongation at break is between 5 and 11%;

(d) the air permeability is less than 5 $l/m^2s$.

16. The adhesive tape of claim 8, wherein the adhesive tape has the following properties:

an adhesive strength on poly(vinylchloride) or aluminium of 1.7 to 2.2 N/cm and/or a rolling ball tack of less than 50 mm.

17. The adhesive tape according to claim 8, wherein the backing is a paper backing.

18. The adhesive tape according to claim 8, wherein the coat weight of the acrylic pressure-sensitive adhesive on the backing, is between 30 and 50 $g/m^2$.

19. A masking tape, based on the adhesive tape of claim 8.

20. A method of temporarily masking of a surface during a painting process, the method comprising: removably affixing the masking tape of claim 10 to the surface.

* * * * *